UNITED STATES PATENT OFFICE.

WILLIAM CLINE, JR., OF CLAYTON, INDIANA.

IMPROVEMENT IN HOG-CHOLERA COMPOUNDS.

Specification forming part of Letters Patent No. 207,345, dated August 27, 1878; application filed June 7, 1878.

*To all whom it may concern:*

Be it known that I, WILLIAM CLINE, Jr., of Clayton, in the county of Hendricks and State of Indiana, have invented a new and valuable Improvement in Medicine for Curing Diseases in Animals; and I do hereby declare that the following is a full, clear, and exact description thereof, which will enable others skilled in the art to which it appertains to make and use the same.

This invention relates to a compound for treating animals for the prevention and cure of cholera and other diseases to which they are subject, also a cure and remedy for chicken-cholera, and for the cure of thumps, and as condition-powders for horses or cattle it is considered very valuable.

The invention consists in combining certain ingredients in about the proportions hereinafter named.

In making the compound I use the following ingredients in about their stated proportions: Five pounds of charcoal, one pound of allspice, nine pounds of flaxseed-meal, one pound of Jamaica ginger, five pounds of Glauber's salts, three pounds of carbonate of soda, three pounds of common salt, all reduced to a powder. This powder is generally put up in suitable packages.

The doses generally found sufficient for the successful treatment and prevention of diseases in animals are as follows:

For each hog, one large table-spoonful of the powder, which may be given with one-half table-spoonful of turpentine, taken with the feed in slop.

For preventive, feed once a week.

If the hogs are sick, use the medicine every day until they begin to improve. If bleeding at the nose or passing blood in any way, give one table-spoonful of tansy-tea in each dose of the medicine.

For thumps, add one tea-spoonful of soda to each dose of the powder.

For condition-powder for horses or cattle, use the powder alone. Dose, one large table-spoonful. If the animal is sick, use every day.

For chicken-cholera, use the medicine the same as for hogs. Dose, one large tea-spoonful to the dozen. Mix in corn-meal dough.

Having now fully described my invention, what I claim as new, and desire to secure by Letters Patent, is—

The within-described compound, consisting of pulverized charcoal, allspice, flaxseed-meal, Jamaica ginger, Glauber's salts, carbonate of soda, and common salt, in about the proportions named, for the purposes set forth.

In testimony that I claim the above I have hereunto subscribed my name in the presence of two witnesses.

WILLIAM CLINE, JR.

Witnesses:
    J. I. WILLS,
    BURDETT K. VAUGHN.